(12) United States Patent
Kurose et al.

(10) Patent No.: US 10,100,907 B2
(45) Date of Patent: Oct. 16, 2018

(54) DEFORMATION MOTION MECHANISM

(71) Applicant: NEC Corporation, Tokyo (JP)

(72) Inventors: Minoru Kurose, Tokyo (JP); Yoshihiko Katsuyama, Tokyo (JP); Kazuo Hamada, Tokyo (JP); Takuro Kobayashi, Tokyo (JP); Naoto Tanimichi, Tokyo (JP); Tsui Happy, Castaic, CA (US)

(73) Assignee: NEC Corporation, Tokyo (JP)

( * ) Notice: Subject to any disclaimer, the term of this patent is extended or adjusted under 35 U.S.C. 154(b) by 291 days.

(21) Appl. No.: 15/089,866

(22) Filed: Apr. 4, 2016

(65) Prior Publication Data

US 2017/0284522 A1    Oct. 5, 2017

(51) Int. Cl.
*F16H 25/20* (2006.01)
*B25J 7/00* (2006.01)

(52) U.S. Cl.
CPC ............ *F16H 25/20* (2013.01); *B25J 7/00* (2013.01); *F16H 2025/2059* (2013.01)

(58) Field of Classification Search
CPC ..................... F16H 2025/2059; B25J 7/00
See application file for complete search history.

(56) References Cited

U.S. PATENT DOCUMENTS

| | | | | |
|---|---|---|---|---|
| 3,704,846 A | * | 12/1972 | Clark ........................ | B23Q 1/36 248/125.2 |
| 3,935,486 A | * | 1/1976 | Nagashima ............... | B23Q 1/36 310/12.06 |
| 4,946,329 A | * | 8/1990 | Krueger ..................... | B25J 7/00 359/896 |
| 5,131,761 A | * | 7/1992 | Bury ........................ | B23Q 1/36 384/37 |

(Continued)

FOREIGN PATENT DOCUMENTS

JP    2003-075572 A    3/2003
WO    WO-2006/098010 A1    9/2006

OTHER PUBLICATIONS

Hitachi Seiko Ltd., "Microfilm of the specification and drawings annexed to the written application of Japanese Utility Model Application No. 94622/1980 (Laid-open No. 18935/1982)," 7 pages (Jan. 30, 1982).

(Continued)

*Primary Examiner* — William Kelleher
*Assistant Examiner* — Gregory T Prather
(74) *Attorney, Agent, or Firm* — Wilmer Cutler Pickering Hale and Dorr LLP

(57) ABSTRACT

A novel deformation motion mechanism with precise motion precise motion and structural robustness is achieved. A deformation motion mechanism includes: an elastic ring member shaped symmetrically with respect to a center line, wherein one end of the elastic ring member is fixed and the (Continued)

other end is movable along the center line; a drive unit which is placed within the elastic ring member and is arranged to rotate a feed screw engaged with both ends of the elastic ring member along an operating line orthogonal to the center line, to press or stretch the elastic ring member along the center line; and a plurality of flexible arms which connects the drive unit to the elastic member in at least a direction of the center line.

8 Claims, 5 Drawing Sheets

(56) References Cited

U.S. PATENT DOCUMENTS

| | | | | |
|---|---|---|---|---|
| 5,252,884 | A * | 10/1993 | Dona | B23Q 1/34 |
| | | | | 310/328 |
| 9,920,874 | B2 * | 3/2018 | Kurose | F16M 11/245 |
| 2016/0221138 | A1 * | 8/2016 | Toyama | B23Q 5/40 |
| 2017/0030514 | A1 * | 2/2017 | Kurose | F16H 25/20 |

OTHER PUBLICATIONS

International Search Report and Written Opinion issued by the Japan Patent Office as International Searching Authority for International Application No. PCT/JP2017/014047 dated Jun. 20, 2017 (7 pages).

* cited by examiner

DEFORMATION MOTION MECHANISM

BACKGROUND

The present invention relates to a mechanism which produces predetermined motion by a predetermined deformation.

With the increasing market demand for precision technology, a linear motion actuator providing high precision has become important for machinery requiring precise displacement such as multiple-degree-of-freedom displacement mechanism, micro-manipulator or the like. In most cases, such a fine linear motion actuator employs reduction gearing mechanism, which requires not only a plurality of parts such as different gears but also backlash adjustment of gears and other alignments during its assembly.

In order to eliminate the need of backlash adjustment and other alignments, there has been proposed a simplified linear motion mechanism using a combination of elastic plates to allow fine linear displacement (see Japanese Patent Unexamined Publication No. JP2003-075572). More specifically, two elastic plates are fixed to a fixed block at one ends and to a movable block at the other ends. The two elastic plates placed in parallel are connected by a curve elastic plate in the approximate shape of a letter H. The movable block is supported by an elastic plate orthogonal to a plane formed by the H-shaped elastic plates. The curve elastic plate is connected to the slider of a micrometer at the center thereof. Accordingly, extension or contraction of the slider causes the curve elastic plate to push or pull the parallel elastic plates in widening or narrowing directions, which linearly moves the movable block in the retracting or extending direction.

SUMMARY

However, the above-mentioned linear motion actuator using reduction gearing mechanism requires a plurality of parts, complicated assembly process and complicated adjustment operations. The above-mentioned linear motion mechanism using the elasticity of combined elastic plates has the spatial arrangement of a plurality of elastic plates, resulting in weakness in structural strength, which makes it difficult to achieve precise displacements. Accordingly, the existing techniques cannot achieve a light-weight, miniaturized and simply-manufactured linear motion mechanism providing high precision.

An object of the present invention is to provide a novel deformation motion mechanism with precise motion and structural robustness.

According to the present invention, a deformation motion mechanism includes: an elastic ring member shaped symmetrically with respect to a center line, wherein one end of the elastic ring member is fixed and the other end is movable along the center line; a drive unit which is placed within the elastic ring member and is arranged to rotate a feed screw engaged with both ends of the elastic ring member along an operating line orthogonal to the center line, to press or stretch the elastic ring member along the center line; and a plurality of flexible arms which connects the drive unit to the elastic member in at least a direction of the center line.

According to the present invention, a deformation motion method includes: preparing an elastic ring member shaped symmetrically with respect to a center line, wherein one end of the elastic ring member is fixed and the other end is movable along the center line wherein a drive unit is placed within the elastic ring member and is arranged to rotate a feed screw engaged with both ends of the elastic member along an operating line orthogonal to the center line; connecting the drive unit to the elastic ring member through a plurality of flexible arms in at least a direction of the center line; and by the drive unit, rotating the feed screw to press or stretch the elastic ring member along the operating line.

As described above, according to the present invention, the drive unit is placed within the elastic ring member and is flexibly connected to the elastic ring member through the flexible arms in at least a direction of the center line. Accordingly, the drive unit is placed at the center of the elastic ring member irrespective of the presence or absence of elongated deformation of the elastic ring member. Further, the flexible arms are flexible in the center line direction but rigid in the operating line direction. Accordingly, the flexible arms prevents the drive unit from rotating when the drive unit rotates the feed screw.

DETAILED DESCRIPTION

1. Outline of Embodiment

According to an exemplary embodiment of the present invention, a deformation motion mechanism is arranged to use a pressure mechanism to deform a symmetrically shaped elastic ring member along a center line of the symmetrically shaped elastic member to produce a linear motion. More specifically, the pressure mechanism is composed of a feed screw and a drive unit which are provided within the elastic ring member. The feed screw is screwed into a pair of nuts provided at the respective ends of the elastic ring member. The feed screw may have left-handed and right-handed screw sections which are screwed in the pair of nuts, respectively. The drive unit is arranged to rotate the feed screw to press or stretch the hard spring in the minor-axis direction to produce a linear motion in a direction of the major axis of the hard spring.

In the above-mentioned structure, since the drive unit rotates the feed screw, the drive unit has to be fixed to something secured so as not to rotate itself. However, the drive unit cannot be fixed rigidly because the drive unit joined to the feed screw moves in the major-axis direction of the hard spring when pressing or stretching the hard spring in the minor-axis direction. For instance, if the drive unit is fixed rigidly to the hard spring, the drive unit causes hard deformation of the hard spring, resulting the linear motion with a low degree of accuracy. If the drive unit is fixed rigidly to the base plate of the deformation motion mechanism, the drive unit cannot be moved, which may cause unexpected deformation of the hard spring.

Accordingly, it is important to fix the drive unit flexibly to the hard spring. Preferably, the drive unit is fixed to the hard spring through symmetrically arranged flexible arms so as to place the drive unit at the center of the elliptical ring of the hard spring before or after deformed. Further preferably, the flexible arms are flexible in the major-axis direction of the hard spring but rigid in a direction orthogonal to the plane including the elliptical ring of the hard spring. As an example, each of the flexible arms may be formed using an elastic plate or a leaf spring. Hereinafter, an exemplary embodiment of the present invention will be describe with references to figures.

2. Exemplary Embodiment 2.1) Arrangement

Figure 1:
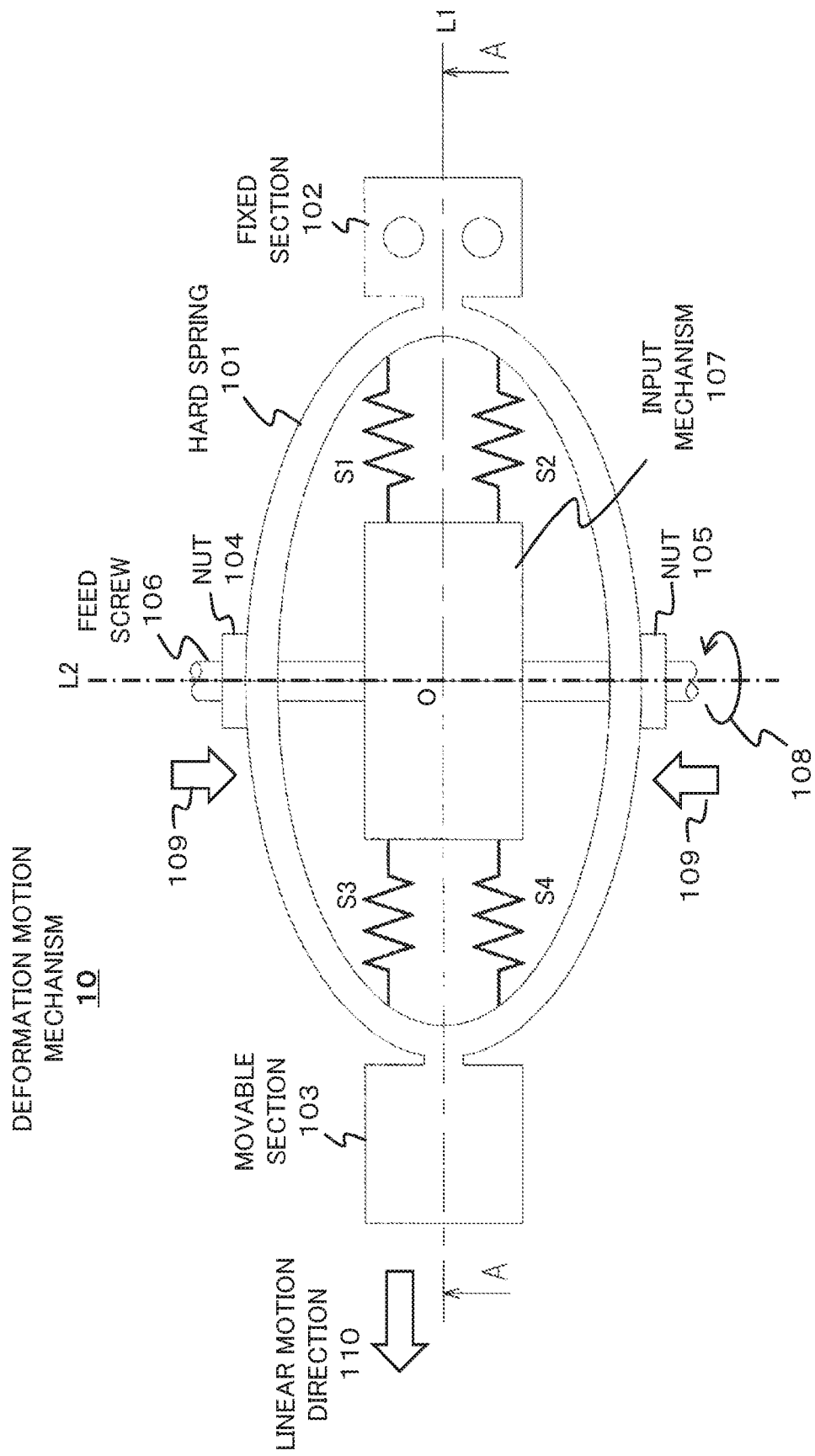
FIG. 1 is a plan view illustrating a deformation motion mechanism according to an exemplary embodiment of the present invention.
Figure 2:
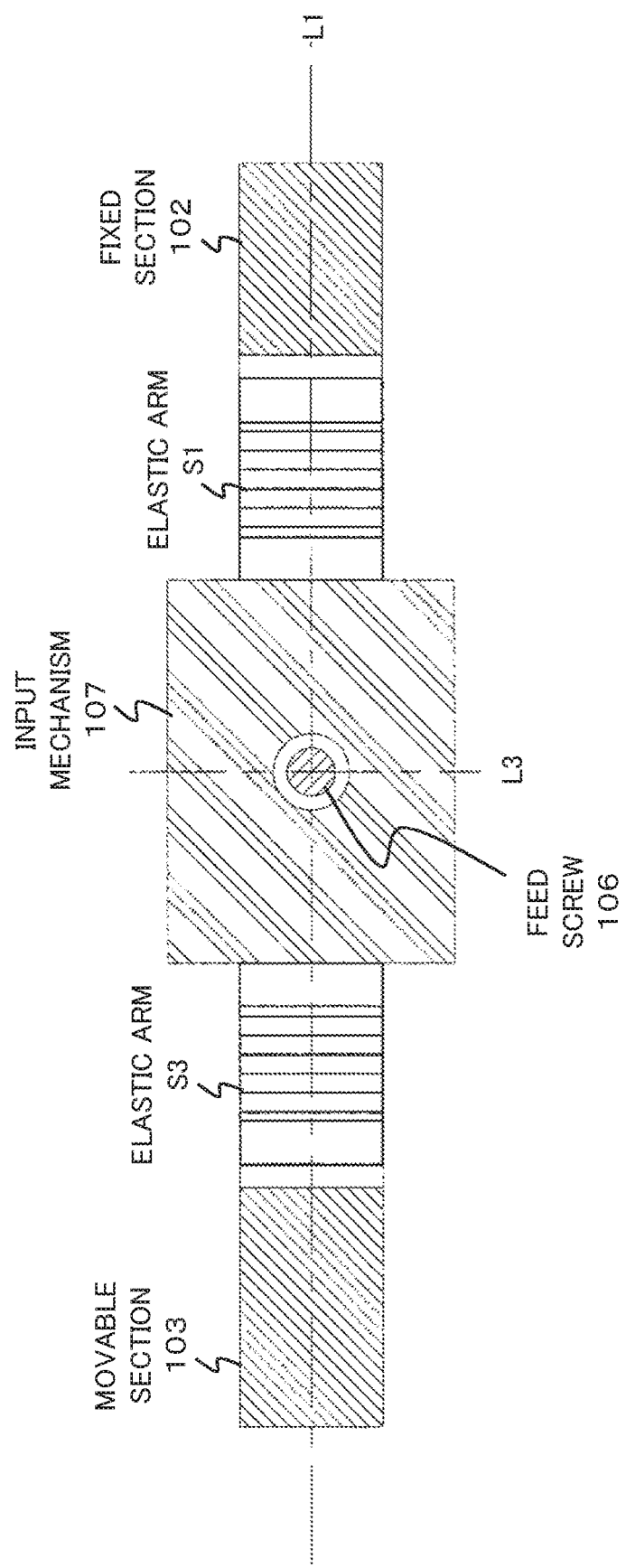
FIG. 2 is a sectional view taken along lines A-A of FIG. 1.

Referring to FIGS. 1 and 2, a deformation motion mechanism 10 includes a hard spring 101 shaped like an elliptical ring symmetrically with respect to a center line L1 and an operating line L2 orthogonal to the center line L1. The hard spring 101 is connected to a fixed section 102 and a movable section 103 at both ends of the major axis of the hard spring 101. The hard spring 101 is joined to a pressure mechanism composed of a pair of nuts 104 and 105, a feed screw 106 and an input mechanism 107.

The feed screw 106 may have left-handed and right-handed screw sections which are screwed into the nuts 104 and 105, respectively. The nuts 104 and 105 are fixed respectively to both sides of the hard spring 101 in the direction of the minor axis so that the hard spring 101 is sandwiched between the nuts 104 and 105. The input mechanism 107 rotates the feed screw 106 to press or stretch the hard spring 101 depending on rotation direction. In FIG. 1, when rotating the feed screw in a direction 108, the hard spring 101 is pressed in the operating direction 109 to move the movable section 103 in the linear motion direction 110.

The input mechanism 107 is a drive unit for rotating the feed screw 106 which rotatably passes through the drive unit as shown in FIG. 2. The input mechanism 107 is placed within the elliptical ring of the hard spring 101 and is flexibly joined to the hard spring 101 through an even number of elastic arms (here, four elastic arms S1-S4). The elastic arms S1-S4 having the same elasticity are placed symmetrically with respect to a center point O, the line (or plane) L1, and/or the line (or plane) L2 so as to keep the input mechanism 107 at the center of the elliptical ring of the hard spring 101 irrespective of the presence or absence of the deformation.

Preferably, the elastic arms S1-S4 are placed in parallel along their retracting or extending direction which is the same direction as the major axis of the hard spring 101. In this example, the elastic arms S1-S4 are formed using an elastic plate or a leaf spring and are shaped like an accordion to be made flexible in the major-axis direction of the hard spring 101. However, as shown in FIG. 2, the elastic arms S1-S4 are installed vertically, that is, in a direction L3 orthogonal to the plane L1, causing them to be hardly bent in the direction L3. Accordingly, the elastic arms S1-S4 prevents the input mechanism 107 from rotating when the input mechanism 107 rotates the feed screw 106.

2.2) Operation

Figure 3:
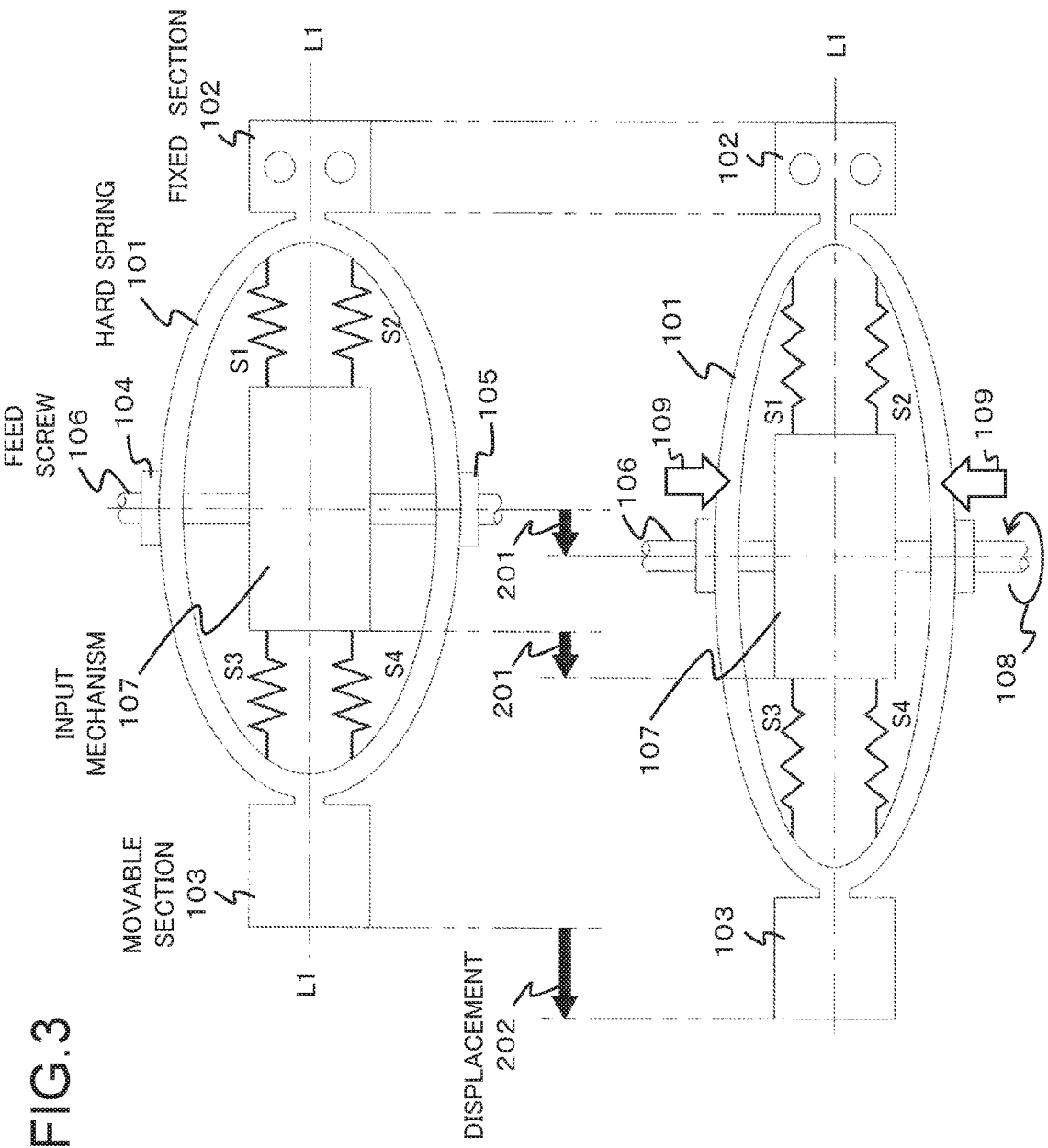
FIG. 3 is a diagram showing a typical operation of the deformation motion mechanism shown in FIG. 1.

Referring to FIG. 3, when the input mechanism 107 rotates the feed screw in the direction 108, the nuts 104 and 105 presses and deforms the hard spring 101 in the direction 109. More specifically, pressure in the direction 109 causes the elliptical ring of the hard spring 101 to be elongated in the direction of its major axis, thereby extending the elastic arms S1-S4 and shifting the feed screw 106 and the input mechanism 107 by a displacement 201 while shifting the movable section 103 by a displacement 202.

Figure 4:
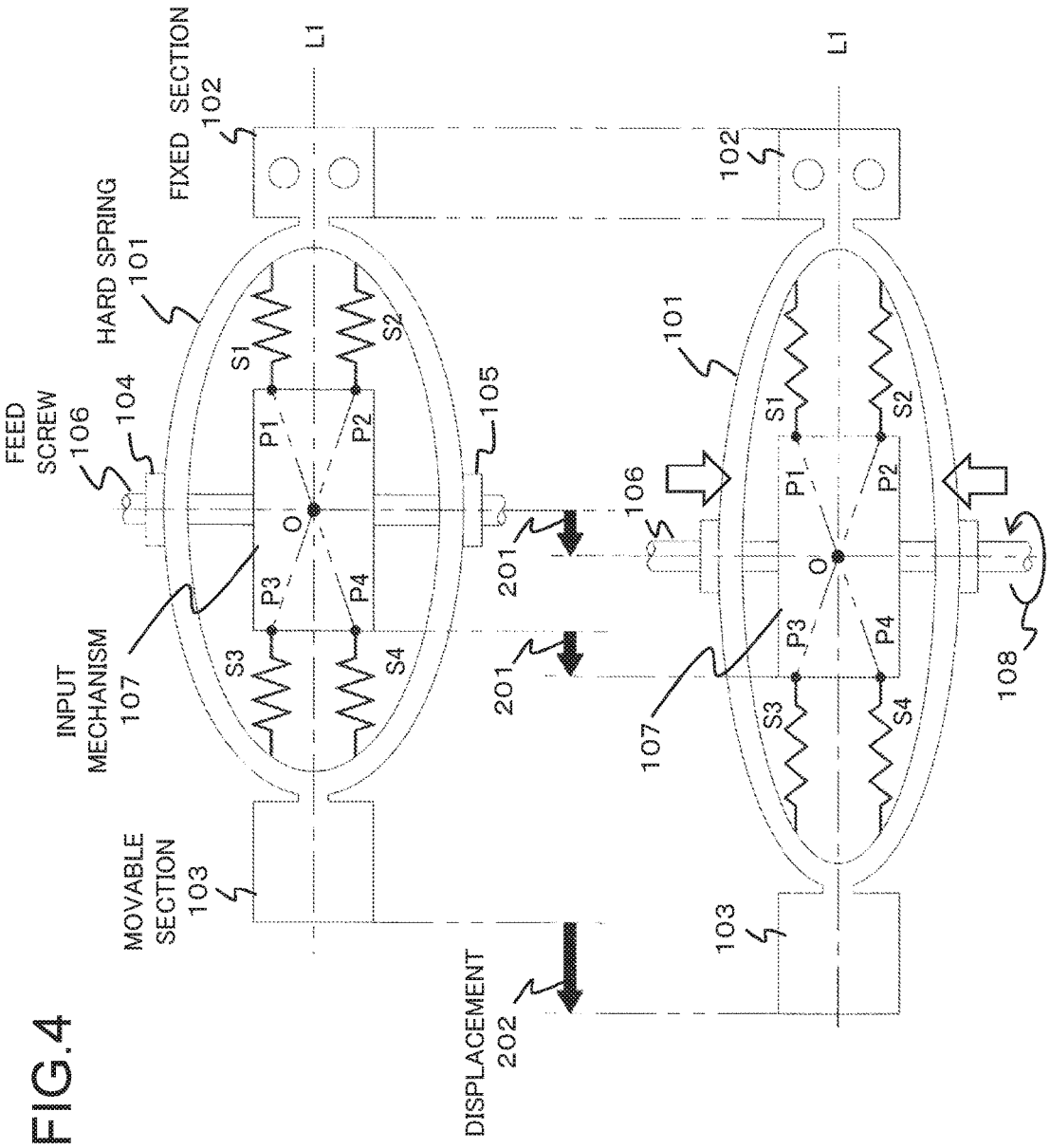
FIG. 4 is a diagram showing an analytical example of the operation of the deformation motion mechanism as shown in FIG. 1.

As shown in FIG. 4, the respective elastic arms S1-S4 are fixed to the input mechanism 107 at points P1-P4, which are symmetric about the center point O of the elliptic ring of the hard spring 101. Accordingly, even when the hard spring 101 is elongated, the input mechanism 107 is kept at the center position of the elongated elliptic ring of the hard spring 101.

Figure 5:
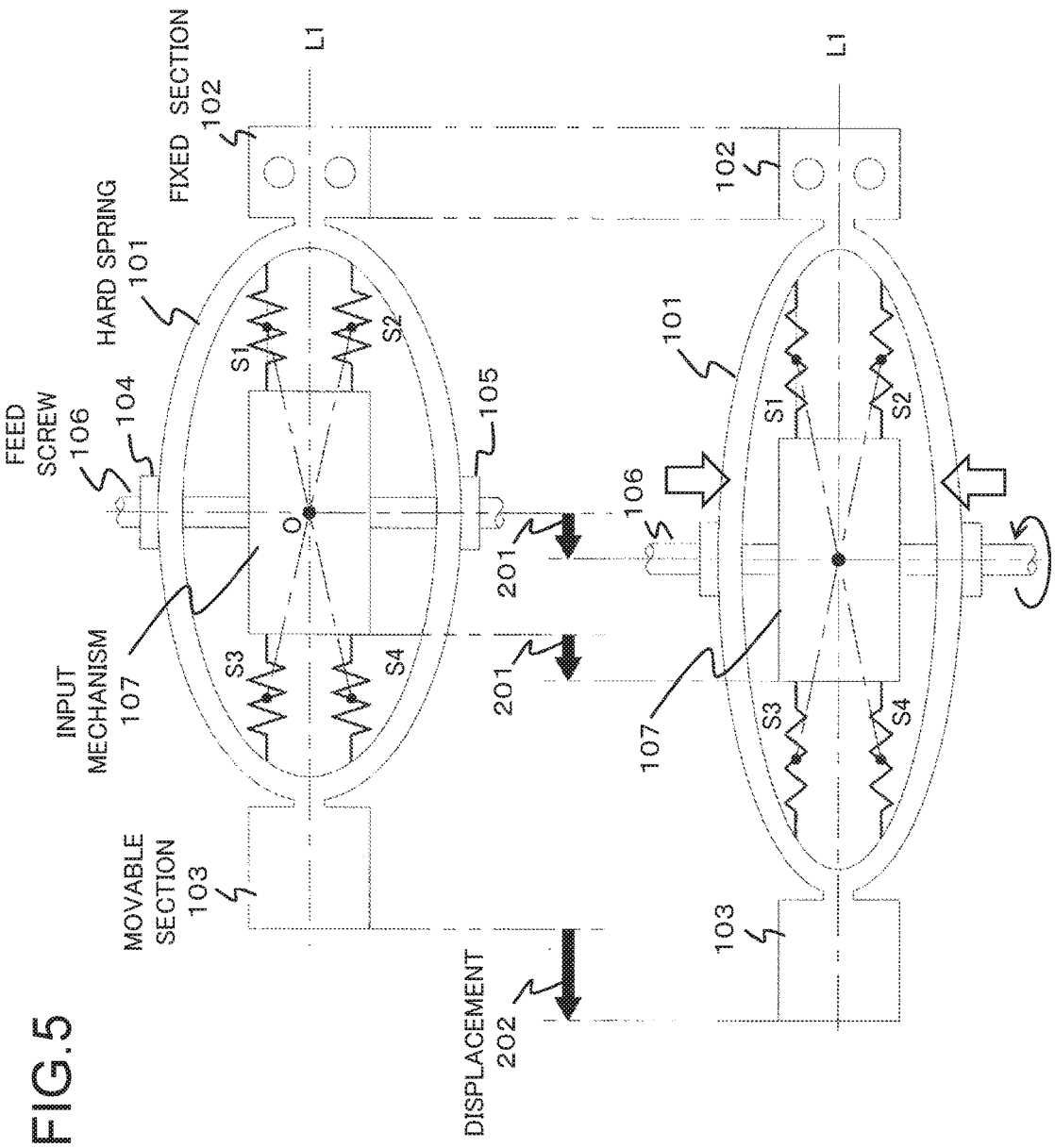
FIG. 5 is a diagram showing another analytical example of the operation of the deformation motion mechanism as shown in FIG. 1.

Similarly, as shown in FIG. 5, the respective elastic arms S1-S4 connecting between the hard spring 101 and the input mechanism 107 are placed symmetrically with respect to the center point O of the elliptic ring of the hard spring 101. Accordingly, even when the hard spring 101 is elongated, the input mechanism 107 is kept at the center position of the elongated elliptic ring of the hard spring 101.

2.3) Advantageous Effects

According to the exemplary embodiment of the present invention, the input mechanism 107 which is arranged to rotate the feed screw 106 to deform the hard spring 101 is placed within the elliptic ring of the hard spring 101 and is flexibly connected to the hard spring through elastic arms S1-S4 which are symmetrically arranged along the major axis of the elliptic ring of the hard spring 101. Accordingly, the input mechanism 107 is placed at the center of the elliptical ring of the hard spring 101 irrespective of the presence or absence of elongated deformation of the elliptic ring.

Further, the elastic arms S1-S4 are flexible in the major-axis direction of the hard spring but rigid in a direction orthogonal to the plane including the elliptical ring. Accordingly, the elastic arms S1-S4 prevents the input mechanism 107 from rotating when the input mechanism 107 rotates the feed screw 106.

3. Other Exemplary Embodiment

The present invention is not limited to the above-mentioned embodiment as shown FIGS. 1 and 2. Any symmetric arrangement of elastic arms supporting the input mechanism or the drive unit within the elliptic ring can be employed, provided that the symmetrically arranged elastic arms allow the input mechanism or the drive unit to be placed at the center of the elliptical ring irrespective of the presence or absence of deformation of the elliptic ring.

The present invention may be embodied in other specific forms without departing from the spirit or essential characteristics thereof. The above-described exemplary embodiment and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A deformation motion mechanism comprising:
    an elastic ring member shaped symmetrically with respect to a center line, wherein one end of the elastic ring member is fixed and the other end is movable along the center line;
    a drive unit which is placed within the elastic ring member and is arranged to rotate a feed screw engaged with both ends of the elastic ring member along an operating line orthogonal to the center line, to press or stretch the elastic ring member along the center line; and a plurality of flexible arms which connects the drive unit to the elastic member in at least a direction of the center line.

2. The deformation motion mechanism according to claim 1, wherein the plurality of flexible arms are arranged symmetrically about a point at which the center line and the operating line intersect.

3. The deformation motion mechanism according to claim 1, wherein each of the plurality of flexible arms is flexible in the direction of the center line but rigid in a direction orthogonal to a ring plane of the elastic ring member.

4. The deformation motion mechanism according to claim 1, wherein each of the plurality of flexible arms is formed from an elastic plate of a predetermined width, wherein the flexible arm is installed such that a width direction of the elastic plate is the same as a direction orthogonal to a ring plane of the elastic ring member.

5. A deformation motion method comprising:
preparing an elastic ring member shaped symmetrically with respect to a center line, wherein one end of the elastic ring member is fixed and the other end is movable along the center line wherein a drive unit is placed within the elastic ring member and is arranged to rotate a feed screw engaged with both ends of the elastic member along an operating line orthogonal to the center line;
connecting the drive unit to the elastic ring member through a plurality of flexible arms in at least a direction of the center line; and
by the drive unit, rotating the feed screw to press or stretch the elastic ring member along the operating line.

6. The deformation motion method according to claim 5, wherein the plurality of flexible arms are arranged symmetrically about a point at which the center line and the operating line intersect.

7. The deformation motion method according to claim 5, wherein each of the plurality of flexible arms is flexible in the direction of the center line but rigid in a direction orthogonal to a ring plane of the elastic ring member.

8. The deformation motion method according to claim 5, wherein each of the plurality of flexible arms is formed from an elastic plate of a predetermined width, wherein the flexible arm is installed such that a width direction of the elastic plate is the same as a direction orthogonal to a ring plane of the elastic ring member.

* * * * *